United States Patent [19]
Bachalo et al.

[11] Patent Number: 5,547,327
[45] Date of Patent: Aug. 20, 1996

[54] METHOD AND APPARATUS FOR CONTINUOUSLY DETERMINING THE INCLINATION AND DRAFT OF A WATERBORNE FLOATING VESSEL TO ENABLE AUTOMATIC LOADING OF THE VESSEL

[75] Inventors: William D. Bachalo, Los Altos Hills; Adam Isakovic, San Jose, both of Calif.

[73] Assignee: Aerometrics, Inc., Sunnyvale, Calif.

[21] Appl. No.: 523,046

[22] Filed: Sep. 1, 1995

[51] Int. Cl.⁶ .................................................. B65G 67/62
[52] U.S. Cl. ..................... 414/137.1; 73/299; 414/139.7; 414/139.8; 414/786
[58] Field of Search ........................ 73/299, 300, 301; 114/124, 330, 333; 414/138.2, 138.3, 138.8, 139.6, 139.7, 139.8, 296, 786

[56] References Cited

U.S. PATENT DOCUMENTS

| | | | |
|---|---|---|---|
| 3,038,143 | 6/1962 | Dow | 73/299 X |
| 3,329,808 | 7/1967 | Fisher | 414/139.7 X |
| 3,612,302 | 10/1971 | DeGroot | 414/139.6 |
| 4,215,965 | 8/1980 | Parsons | 414/139.6 |
| 4,218,168 | 8/1980 | Parsons | 414/139.7 |
| 4,254,334 | 3/1981 | Baud | 250/231 R |
| 4,872,118 | 10/1989 | Naidenov et al. | 114/124 X |

OTHER PUBLICATIONS

Technical Report HL-87-10, "Evaluation of Vertical Motion Sensors for Potential Application to Heave Correction in Corps Hydrographic Surveys", Downing & Fagerburg, 1987.

Primary Examiner—Karen B. Merritt
Assistant Examiner—Janice L. Krizek
Attorney, Agent, or Firm—Blakely, Sokoloff, Taylor & Zafman

[57] ABSTRACT

Pressure sensors positioned at strategic points on a floating vessel below the surface of the water provide depth information to a shore based control computer via wireless telemetry. The pressure sensors provide continuous information regarding the draft and inclination of the vessel as it is being loaded. The depth information produced by the pressure signals is telemetered to the control computer via transmitting units positioned on the floating vessel and a shore based receiver. The control computer compares the information from the pressure sensors to desired loading characteristics for the vessel and controls the loading process by sending control signals to a loader controller to adjust the point of loading. The point of loading is maintained so as to keep the vessel within desired trim and draft limits. Loading ceases when a desired amount of material has been delivered into the barge or when the barge is at the desired draft in a level state.

17 Claims, 8 Drawing Sheets

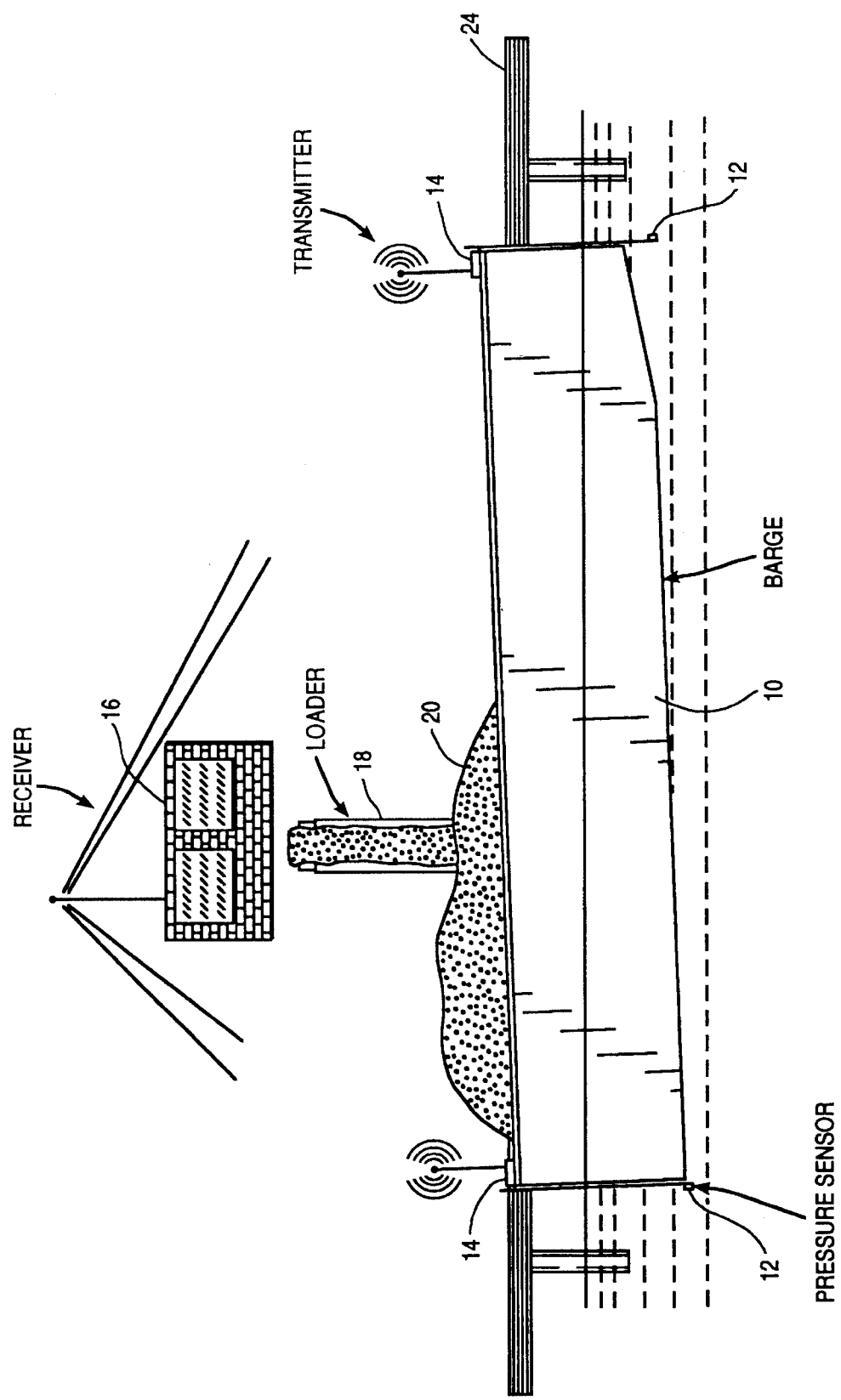
FIG_1

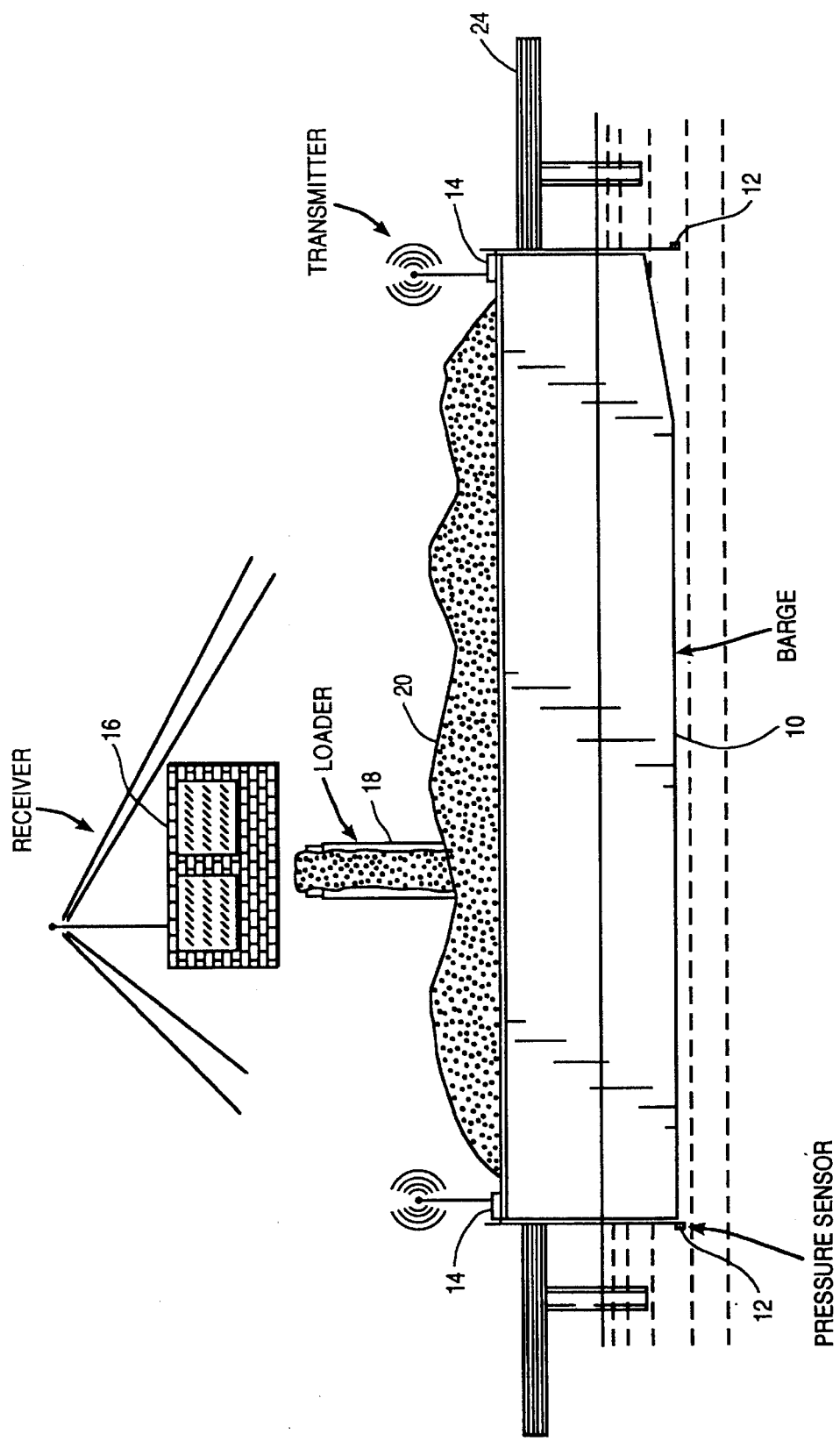

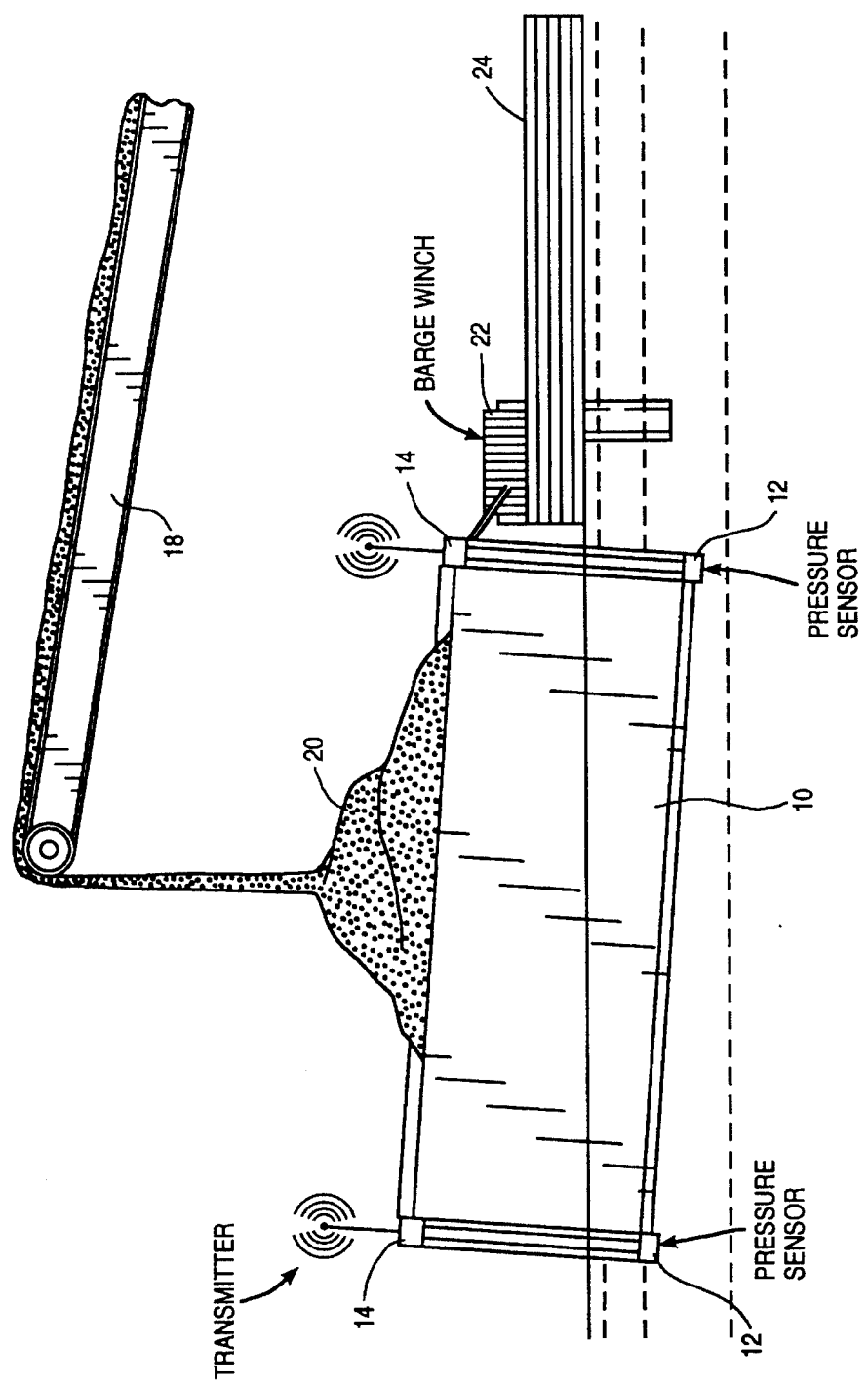
FIG_3

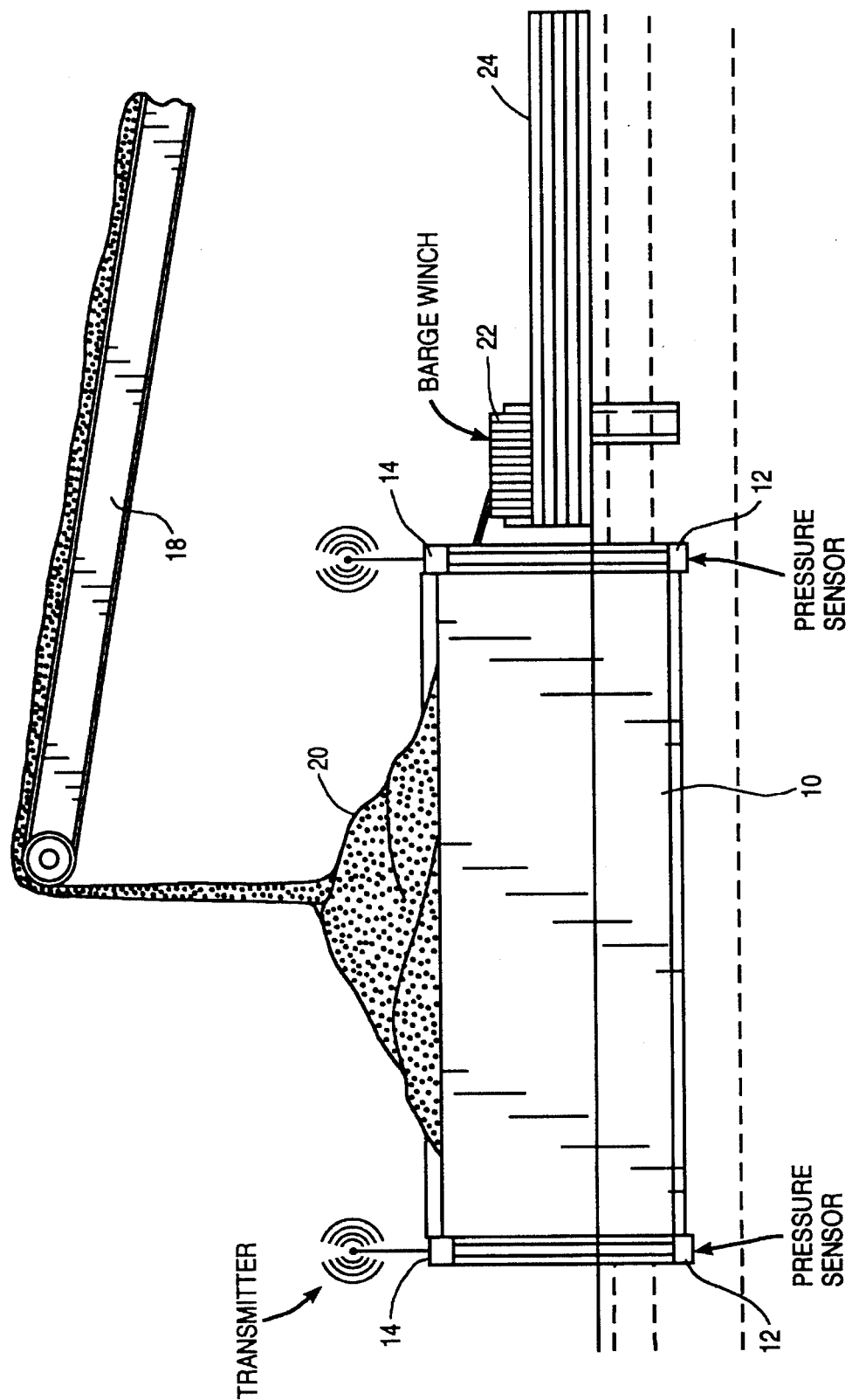
FIG_4

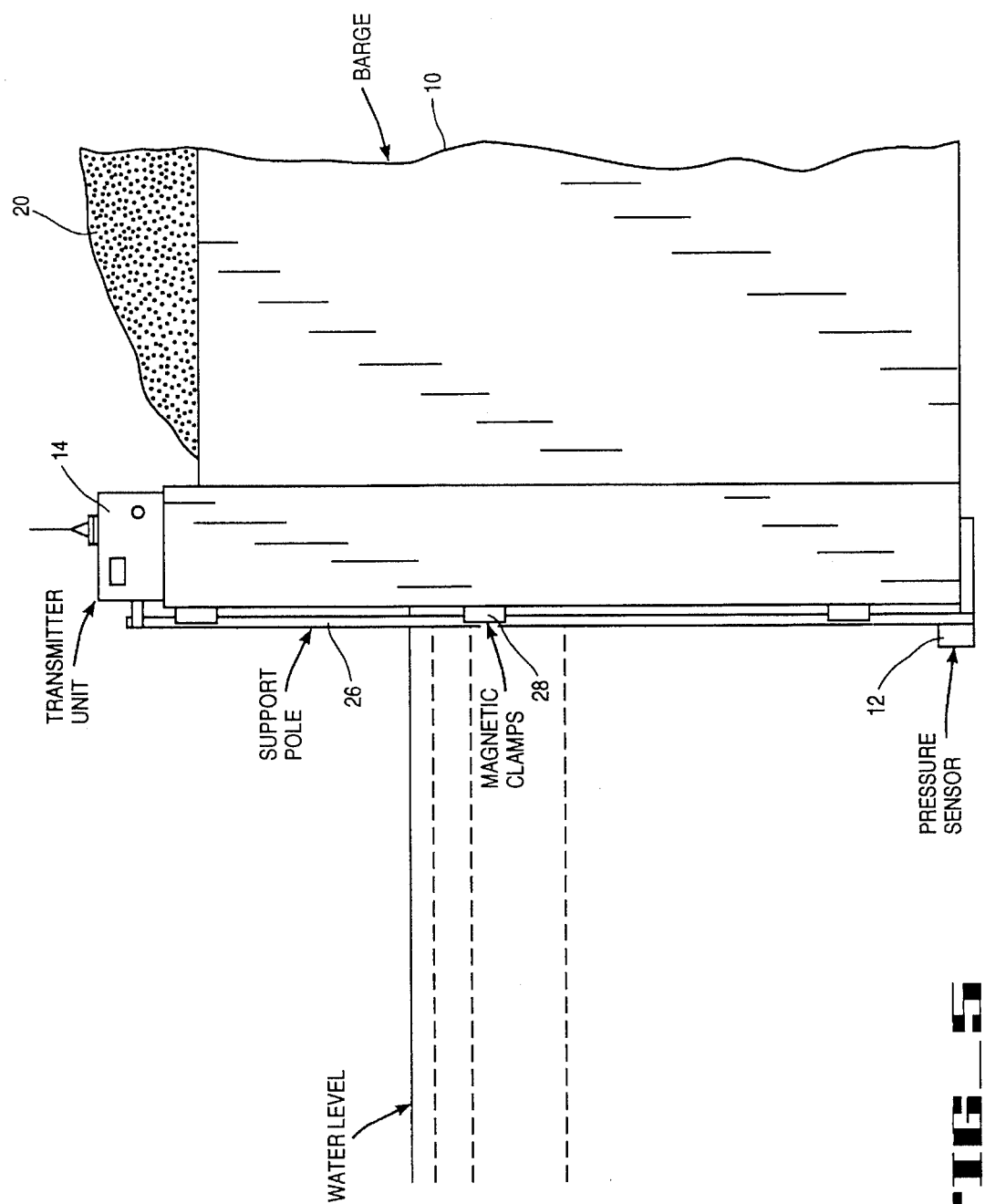
FIG_5

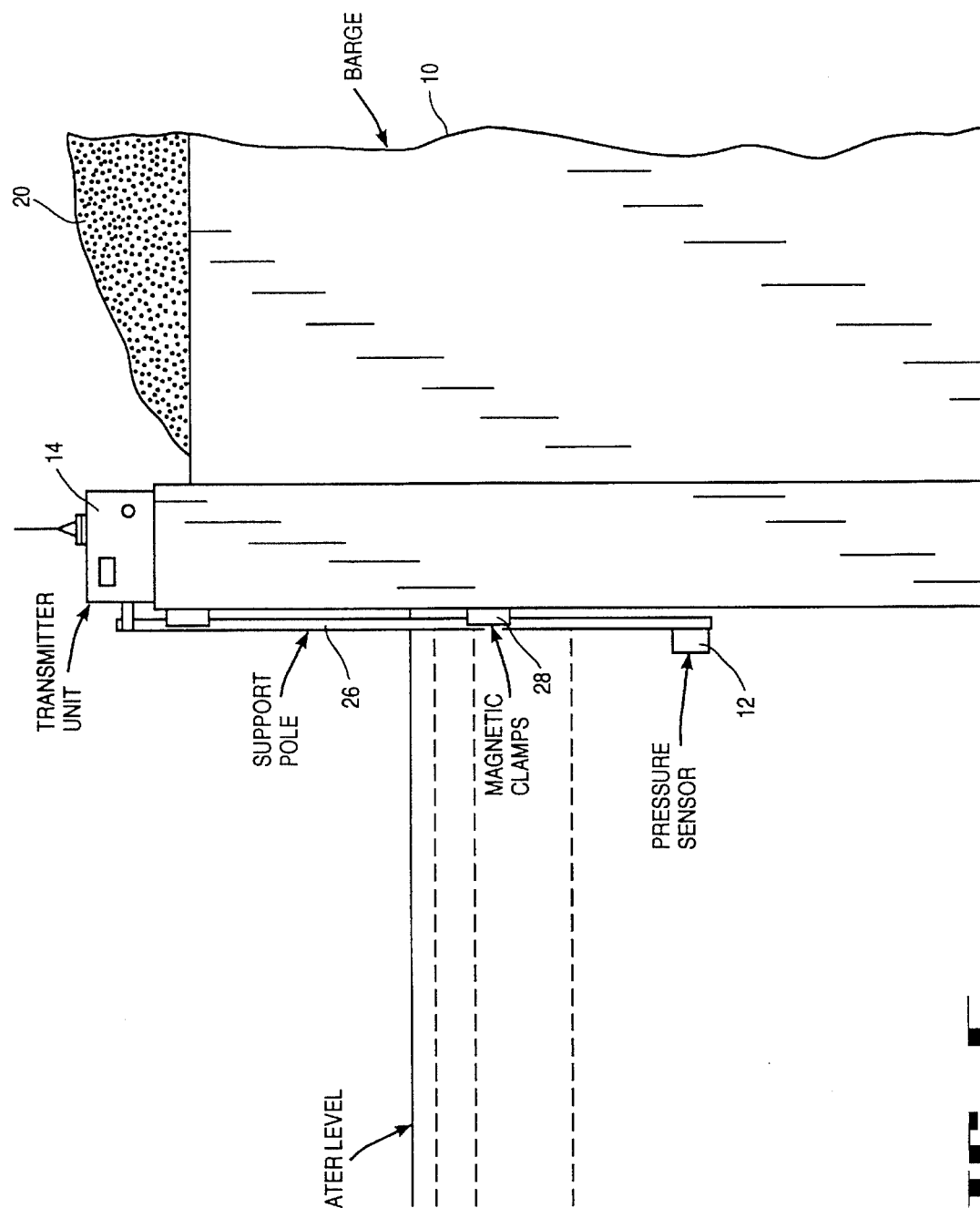
FIG_6

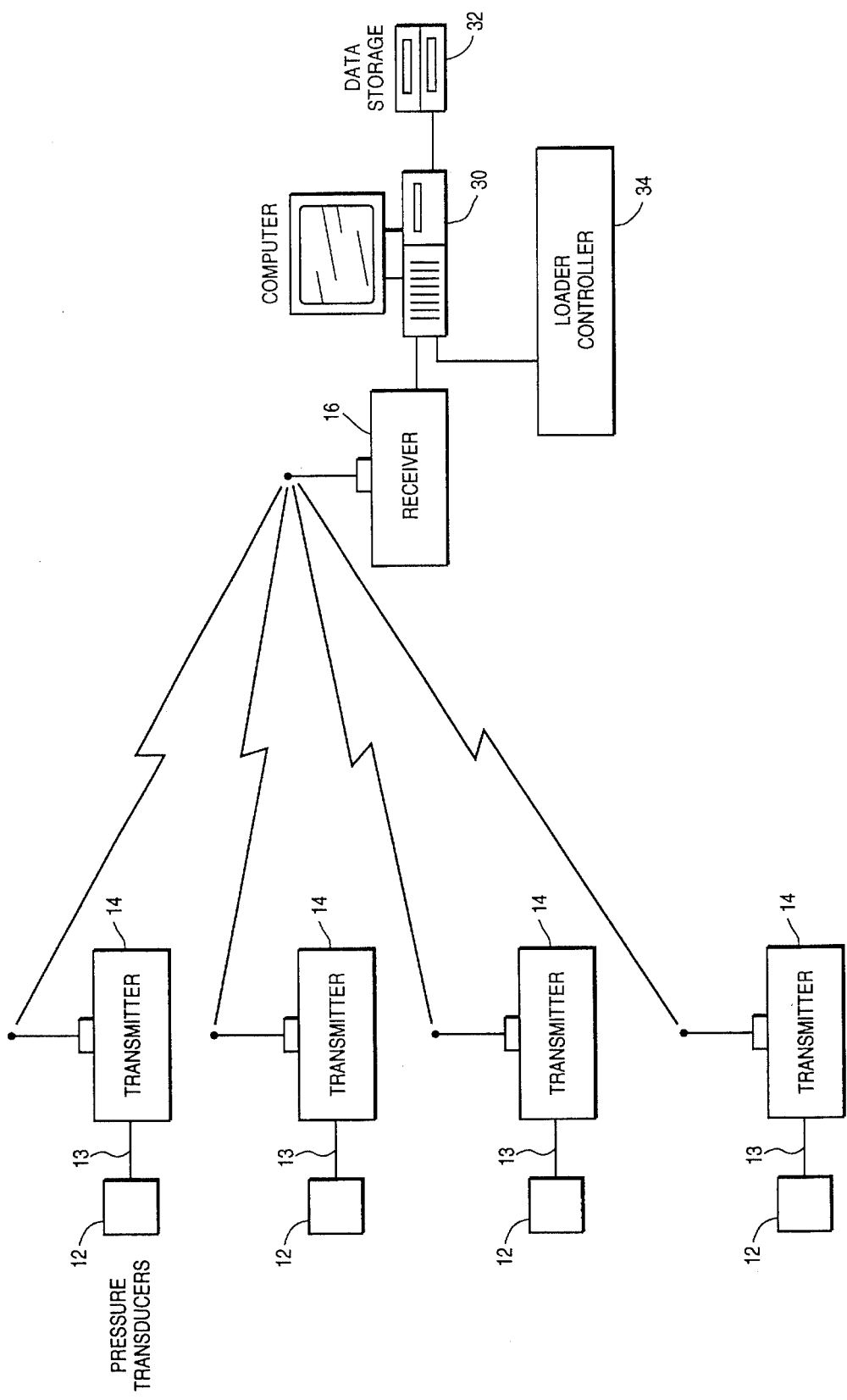

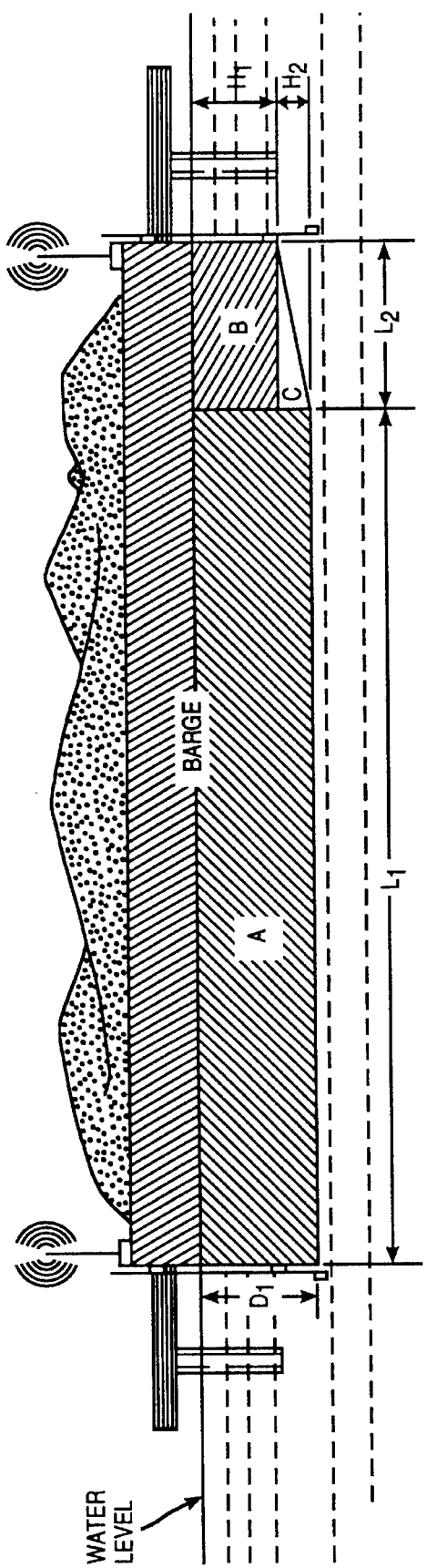

METHOD AND APPARATUS FOR CONTINUOUSLY DETERMINING THE INCLINATION AND DRAFT OF A WATERBORNE FLOATING VESSEL TO ENABLE AUTOMATIC LOADING OF THE VESSEL

BACKGROUND OF THE INVENTION

1. Field of the Invention

The area of the present invention is that of loading barges and other floating vessels and, more particularly, the automatic loading of such vessels through the continuous measurement of the draft and inclination of the vessel.

2. Background Art

The present invention is directed towards the loading of barges and other floating vessels and the ability to automate the loading process. What is critical in the loading process is to insure that the load is uniform such that the barge lies level in the water at the completion of loading. In addition, it is required that the draft of the vessel be known so that the barge does not bottom out in the waterway (river, channel, bay or sea) in which it will be traveling. This information, if measured accurately, can also be used to determine the weight of the load by enabling the calculation of the water displaced.

As indicated, when a barge is fully loaded it is important that the barge lies level in the water. Out-of-level barges have increased hydrodynamic drag as they are being towed or pushed through the water. This increased drag results in increased fuel expenditures for the vessel which is towing or pushing the barge. Hence, accurate leveling of the barge during loading will result in significant fuel savings.

Currently, barges are loaded by having a human operator direct the delivery of the cargo to the barge via a conveyor, crane, etc. The type of device used to load the barge will depend on the type of material to be loaded (coal, iron ore, steel beams, etc.). Periodically during the loading process, an assistant must walk around the periphery of the barge and peer over the side at draft marks on the hull to estimate the draft of the barge. This procedure is dangerous, costly, and inaccurate. It is known that persons performing this task have fallen into the water and have been subject to injury due to impact with the dock, flotsam, the barge, etc.

Draft determination during loading is critical. Overloaded barges may bottom out during transit resulting in potential spills, lost time, increased cost if the barge has to be repaired or refloated, etc. Relying on human observations of worn and faded draft marks not only exposes these individuals to risk, it increases the loadout time, especially if no observation is made until after the barge has been overloaded. In such a case, the barge will have to be towed to a separate location where the cargo can be off loaded and then towed back to the loading point to be reloaded.

U.S. Pat. No. 4,215,965 issued to Parsons describes an automatic loading system for floating vessels. With this approach, the vessel is moved fore-and-aft via a dock winch during loading. The loading process itself is completed using a delivery chute connected to a conveyer. Flowable material is delivered via the conveyer and through the chute into the barge. The loading point is adjusted through the use of a load level sensor in the form of a tilt switch. The switch operates so as to provide a dockside controller with information regarding the height of the load. At the same time, a list sensor provides information regarding the barge's list in the fore-and-aft plane. Loading proceeds until a prescribed amount of material has been delivered into the barge, which is in a level condition upon completion.

Although the above-described loading method allows for automation of the process, no attempt is made to eliminate the need for human observation of the draft of the barge. As previously indicated, this observation process can be very hazardous. Knowing the draft of the barge is critical during the loading process because the depth of a given waterway will change with seasons, amounts of precipitation, tides, etc. In addition, the above apparatus relies on hard wired connections between the tilt sensor, the list sensor and a controller. As is familiar to persons working in dockside loading operations, a number of hazards to such hard wired connections exist from moving vehicles and the like.

SUMMARY OF THE INVENTION

Accordingly, it is an object of the present invention to provide for the automated loading of a waterborne floating vessel without having to expose human operators to unnecessary risk of injury.

It is a further object of the present invention to provide a means for determining the draft and inclination of a floating vessel during the loading process in order to insure that the vessel is not overloaded for the prevailing waterway conditions and to insure that the vessel is not placed in danger of capsizing during loading.

It is another object of this invention to provide an apparatus for continuously determining the draft and inclination of a water-borne floating vessel during loading which is easily transportable and which can be adapted to a variety of vessel types and sizes.

These and other objects of the invention are achieved by a method and apparatus for continuously determining the draft and inclination of a waterborne floating vessel during loading which utilizes pressure sensors positioned at strategic points on the vessel. The pressure sensors provide information regarding the draft of the vessel which is telemetered to a control computer. The control computer compares the input information from the pressure sensors to the desired loading characteristics for the vessel and controls the loading process. The point of delivery of material into the vessel is controlled such that the vessel stays within desired list and draft parameters. Loading ceases when a desired amount of material has been delivered into the vessel or when the vessel is at the selected draft and in a level trim condition.

BRIEF DESCRIPTION OF THE DRAWINGS

FIG. 1 is a schematic side elevation of a barge being loaded, showing the fore-and-aft inclination, the location of the pressure sensors, the transmitters and receiver for the loading controller.

FIG. 2 is a similar view, showing a fully loaded barge in a level state and at a desired draft.

FIG. 3 is a head-on view of the barge being loaded, showing a list in the port-and-starboard plane due to non-uniform loading. The location of the pressure sensors is shown wherein the sensors are positioned such that they are protected from collision with the dock.

FIG. 4 is another head-on view, showing a loaded barge with its list eliminated by redistributing the material during loading.

FIG. 5 is a partially schematic view, illustrating one means of mounting the pressure sensors and transmitter units to the barge.

FIG. 6 is a similar view, showing the pressure sensors mounted in different position.

FIG. 7 is a block diagram, depicting the pressure sensors for sensing the depth, the transmitters and receiver for telemetering the information from the barge to the control center, the computer, the loader controller, and a data storage device wherein information regarding the vessel being loaded and the waterway conditions is stored.

FIG. 8 is a partial schematic, showing how the displaced volume of water can be determined based upon the known characteristics of the barge and the measured depth.

DETAILED DESCRIPTION OF THE INVENTION

Referring to the drawings in detail wherein like numerals designate like parts and components, the numeral 10 designates a barge adapted to carry flowable materials 20. The invention is, however, applicable to any type of floating vessel capable of being loaded with flowable or other materials. In the following description, numerous specific details are set forth in order to provide a thorough understanding of the present invention. However, after reviewing this specification, it will be apparent to those skilled in the art that the present invention may be practiced without these specific details. In other instances, well known structures, techniques and devices have not been described in detail in order to not unnecessarily obscure the present invention.

In a preferred embodiment, the invention comprises pressure sensors 12 positioned at suitable positions on a floating vessel, e.g., barge 10, being loaded with flowable material 20. As indicated in FIGS. 1 and 3, the preferred locations for positioning the sensors 12 is at each of the four corners of the vessel 10 and in the water at a known depth relative to a datum on the vessel. For example, in the case of loading barges, the sensors 12 may be positioned at the bottom of the barge 10 as shown in FIG. 5. In another embodiment, the sensors 12 are positioned below the surface of the water but at a known distance above the bottom of the barge 10 as shown in FIG. 6. In all cases, care is taken to position the sensors 12 such that they are protected from collision with the dock, other vessels, log fenders, etc., as shown in FIGS. 3 and 4.

Generally, where barge 10 is being loaded with flowable material such as coal, listing in both the fore-and-aft plane, as shown in FIG. 1, and the port-and-starboard plane, as shown in FIG. 3, can be expected. As indicated above, the preferred embodiment of the present invention positions pressure sensors 12 at each of the four corners of barge 10. This configuration allows for the determination of the list of the barge in both the fore-and-aft plane and the port-and-starboard plane. In this way the loading process can be controlled so that the barge 10 does not exceed predefined list limits in either plane. When the barge's fore-and-aft list is determined to be unacceptable, the loading process is adjusted so that the barge returns to a level trim, as shown in FIG. 2. Similarly, when the barge's port-and-starboard list exceeds a desired value, the loading is adjusted until the barge returns to level, as shown in FIG. 4. It will be appreciated that during loading the barge 10 will list in both planes simultaneously and the point of loading will be adjusted accordingly.

Although four pressure sensors 12 are used in the preferred embodiment, it will be apparent that a greater or fewer number of pressure sensors can be used. In one embodiment, only two pressure sensors 12 are used. One of the sensors is placed at the stern of the barge 10 and the other sensor is positioned at the bow. In this manner, the two sensors are able to provide data concerning the barge's list along its fore and aft line. In those situations where, because of the characteristics of the material being loaded, no list is expected in the port-and-starboard plane, such a configuration will be all that is required. Other configurations for the pressure sensors will be apparent to those skilled in the art and will, to some degree, be dependent upon the type of vessel and/or material being loaded. Such configurations are within the spirit and scope of the present invention.

The pressure sensors 12 generate an electric signal proportional to their depth below the surface of the water. Knowing the density of the water (fresh or salt), this signal can be translated into a measurement of the depth of the sensor below the surface of the water. In one embodiment of the invention, a salinity measuring device (not shown) is positioned at the same depth as the pressure sensors so that constant information regarding the density of the water can be obtained. Such a device is especially useful in areas where the salinity of the water undergoes significant changes. In other areas, such as inland waterways, it will be sufficient to determine the density of the water only periodically so as to calibrate the pressure sensors or other equipment.

The change in draft of the barge 10 as it is being loaded can be measured directly from the change in pressure as reported by the pressure sensors. Such measurements can easily be made to within a fraction of an inch. By knowing the distance from the sensor location to the bottom of the barge, then the draft of the barge is calculated.

The pressure sensors themselves may be any one of a number of commercially available systems that produce an electric signal proportional to the hydrostatic pressure. In a preferred embodiment of the invention, these are Omega PX102-006G flush diaphragm milivolt output pressure transducers, available from Omega Engineering, Inc., of Stamford, Conn.

The pressure sensors 12 can be installed permanently on the barge 10 at various points along the hull or keel. However, in a preferred embodiment the sensors 12 are attached to the barge 10 only during the loading operation. In this way, the sensitive transducers are not subjected to the hazards of travel along the waterways such as submerged rocks and the like.

As shown in FIG. 5, the pressure sensors 12 are positioned at the end of a support pole 26 and secured to the side of the barge 10 through the use of magnetic clamps 28. Preferably, the pressure sensors 12 are mounted such that they are coincident with the lowest point on the barge 10. In this way, the calculated depth of the sensor will be equal to the depth of the barge. To accommodate barges of various sizes, support pole 26 can be partially telescopic or otherwise expandable.

In another embodiment, as shown in FIG. 6, the pressure sensors 12 are mounted at the end of a support pole 26' which is shorter than the side of the barge 10. In such an embodiment, the overall dimensions of the barge 10 are known so that the distance between the bottom of the barge and the pressure sensor 12 is a known quantity. By adding this known distance to the calculated depth of the sensor, the depth of the barge is determined.

It is also possible to mount the sensors 12 on angled support poles (not shown), in the case of non-perpendicular sided vessels, or directly to the side of the vessel via magnetic clamps or other means. Other means of mounting the pressure sensors 12 will be apparent to those skilled in the art and are encompassed within the spirit and scope of the present invention.

The present invention also comprises a battery operated transmitter 14 which is coupled to the pressure sensor 12 and used to telemeter the information from the sensor 12 to a receiver 16 that is connected to the control computer 30. This allows wireless communications between the barge 10 and the loader controller 34 and eliminates the possibility of cables becoming snagged or otherwise broken during the loading process. In a preferred embodiment, the transmitter units 14 are designed to receive an electric signal from a submersible pressure sensor 12 and telemeter the signal to shore via a radio transceiver. The associated receiver unit 16 has a computer interface (not shown). The receiver unit 16 is designed to receive digitized signals from the transmitter unit via a radio transceiver and provide an output signal for presentation to an input port of computer 30. In a preferred embodiment, the transmitter units are Bulletin D/E 1000/ E985 analog signal transmitters and the receiver unit is a Bulletin D 620/E 985 analog signal receiver, both available from Consolidated Electric Co. of Saint Paul, Minn. Although in this preferred embodiment each pressure sensor 12 is coupled to a dedicated transmitter 14, it will be apparent that a single transmitter which is coupled to each of pressure sensors via a multiplexer (not shown) can be used.

There are times when it is not possible to use wireless communications. For example, when the loading of the vessel must occur in areas where ammunition or other volatile materials are being loaded or otherwise transported, wireless communication cannot be used. For this reason, in another embodiment of the invention, the transmitters 14 communicate with the receiver 16 via wire cables (not shown).

The operation of the present invention is described with reference to FIG. 7. Once positioned on the barge 10, each one of the pressure sensors 12 produce an electric signal which is proportional to the depth of the sensor below the surface of the water. The electric signal from each pressure sensor 12 is carried to an associated transmitter 14 via a wire cable 13. Typically, the output signal from the pressure sensor is in the milivolt range. The transmitter 14 may amplify this signal and then use it to modulate a carrier signal in typical fashion. The modulated carrier signal is then broadcast by the transmitter 14 to receiver 16 which is located dockside near control computer 30. The modulated carrier signal which is broadcast by transmitter 14 is usually in the VHF/UHF range although other frequencies may be used.

Receiver 16 receives the signals broadcast by each of the transmitters 14. Receiver 16 typically includes a demodulator to extract the original information produced by the pressure sensor 12 from the carrier signal sent by each of the transmitters 14. The output of receiver 16 will then be a signal which contains the depth information produced by each of the pressure sensors 12. In the preferred embodiment, this signal is compatible with standard RS 232 voltage levels, however, other output signals can be used.

The output signal from the receiver 16 is then presented to the control computer 30 via a serial or other input port. In one embodiment, the control computer 30 is a general purpose personal computer executing dedicated software which allows the computer 30 to calculate the depth of sensors 12 based on the signals provided by receiver 16. In other embodiments of the invention, the control computer 30 can be a dedicated microprocessor controller based on, for example, the x86 or Pentium family of processors available from Intel Corporation of Santa Clara, Calif.

The control computer 30 is associated with and coupled to a data storage device 32 which contains information regarding the vessel to be loaded, the material to be loaded, navigation information concerning the waterways to be traveled and other information to enable complete automation of the loading process. For example, in the case of loading a barge with flowable material, the dimensions of the barge can be stored along with the parameters of the material to be loaded. Data storage device 32 will also contain the instructions to be executed by computer 30 to facilitate the loading process. The data storage device 32 may be the hard drive of a general purpose personal computer, a separate floppy disk or an EPROM chip incorporated into a dedicated microprocessor based controller. Other storage devices such as magnetic tape drives and CD-ROMs may also be used.

Typically, an input device such as a general purpose alpha-numeric keyboard (not shown) will also be coupled to the computer 30. Such a device will enable a human operator to input parameters such as the desired draft of the vessel and other information. An alarm or other signaling device (not shown) may also be coupled to the computer 30 to warn the human operator in the event of a system failure or to indicate when a loading cycle has been completed. In other embodiments, the operator may be informed of the loading status via periodically updated messages on a display screen coupled to computer 30.

The control computer 30 is coupled to a loader controller 34. The loader controller 34 accepts control signals output from the computer 30 and commences, adjusts and terminates the loading process accordingly. As further described below, the loader controller 34 may include a conveyer 18 and a barge winch 24, as shown in FIGS. 3 and 4, or the loader controller 34 may be a combination of a crane and a human operator (not shown). Other loader controller devices will be apparent to those skilled in the art and will vary depending upon the type of vessel and material being loaded.

The loading process typically commences with an empty barge 10 secured alongside a dock 24. An operator installs the pressure sensors 12 at strategic points along the vessel, preferably one at each of the corners, and connects the transmitters 14. Preferably, the transmitters 14 are positioned at stable points on the barge 10 and are secured such that they will not fall overboard as the barge moves.

In the event that the sensors 12 are not installed such that they are coincident with the bottom of the barge, the operator notes the depth of the pressure sensors relative to a suitable datum on the vessel. For pressure sensors 12 which are permanently installed on a barge, the operator merely turns them on and connects the transmitters 14.

Once the operator has verified correct operation of the pressure sensors 12 and transmitters 14, the operator returns to the operations center and enters the desired loading characteristics into the control computer 30. This information can be recalled from the data storage device 32 based on characteristics such as the serial number of the vessel, or can be entered separately for each vessel. The control computer 30 can be executing dedicated software which prompts the operator to enter information such as the serial number of the vessel, the type of material 20 being loaded, the amount of material 20 to be loaded, the type of loading device (e.g., conveyor 18), the waterways which the vessel will be traveling upon, the desired final draft of the vessel, listing thresholds not to be exceeded during loading, etc.

Loading commences with a signal from the control computer 30 to the loader controller 34. The loader controller 34 might be a simple electric or hydraulic switch coupled to a conveyor 18 or other loading device which, when activated by the control computer 30, switches on, allowing the delivery of flowable material 20 into the barge 10. The loader controller 34 will also have means for altering the point of delivery of the material 20 into the barge 10. For example, as shown in FIG. 3, a barge winch 22 may be used. The barge winch 22 is controlled by signals from the control computer 30 such that as the barge 10 is being loaded, it is winched in a fore-and-aft direction along side of the dock 24. In this way, the point of delivery of material 20 into the barge 10 is altered in response to commands from the control computer 30. In other embodiments of the invention, a crane may be used as the loading device for delivering material such as steel beams or railroad ties. In such a case, the control computer 30 would provide control signals to advise the crane operator of where to place the materials in/on the vessel being loaded.

During the loading process, the pressure sensors 12 continuously report the draft at each corner of the barge 10 by generating electric signals proportional to their depth below the surface of the water. This information is transmitted via transmitters 14 to receiver 16. Receiver 16 then provides an output signal to the control computer 30 as described above. Control computer 30 then calculates the listing of the vessel in both the fore-and-aft and port-and-starboard planes through the use of appropriate software or dedicated hardware. In this fashion, the loading characteristics of the barge 10 are continuously monitored.

In one embodiment, as shown in FIG. 1, each of the pressure sensors 12 is positioned at an initial depth before loading commences. The relative depths of the pressure sensors define the level trim condition for the barge and are stored by control computer 30. Once the loading process begins, the list of the barge 10 is determined by computing the new depth of each of the pressure sensors 12 and comparing the relative depths of the sensors to the previously stored level trim condition. Where loading commences at a point near the stern of the barge 10, the pressure sensors 12 positioned near the stern will report a greater depth than those positioned near the bow. Similarly, as shown in FIG. 3, the barge may develop a list in the port-and-starboard plane where the conveyor 18 deposits material closer to one side of the barge than the other. Control computer 30 constantly monitors these angles of list.

When the vessel begins to list too much, or has reached a predetermined list limit, the loading point is adjusted. When the excessive list occurs in the fore-and-aft plane, control computer 30 adjusts the point of loading by sending control signals to barge winch 22. Barge winch 22 responds by moving the barge 10 in a fore-and-aft direction alongside the dock so that the loading point is moved further forward. As new material is loaded at this new loading point, barge 10 will begin to level out in the water. As shown in FIG. 2, the loading point is adjusted so that a fully loaded barge is again in a level trim condition. For the case where the excessive list has occurred in the port-and-starboard plane, control computer 30 adjusts the point of loading by sending control signals to conveyor 18 which adjusts the point of loading accordingly by moving with respect to the barge 10. At all times, barge 10 is kept within desired list and draft parameters.

Loading ceases when a desired amount of material 20 has been delivered or when the load is evenly distributed with barge 10 at the desired draft and in a level state. At that point, the control computer 30 sends control signals to the loader controller 34 (e.g., the conveyor 18) to cease the delivery of flowable material 20 into barge 10. The operator is notified that the loading process has been completed.

The overall displacement of barge 10 at the completion of loading can be used to determine the weight of the material loaded, as shown in FIG. 8. The weight of the load is calculated from the density of the material loaded multiplied by the volume of the barge. The volume of the barge can be directly calculated from its dimensions and the change in draft between the empty and loaded states. Alternatively, the weight of material 20 loaded could be determined from the density of the water and the volume of water displaced.

In an alternative embodiment of this invention, a single pressure sensor 12 and an inclinometer (not shown) can be used in place of the four pressure sensors. The inclinometer is fixed to barge 10 so as to provide continuous information regarding the list of the vessel in both the fore-and-aft plane and the port-and-starboard plane. An inclinometer of the type described in U.S. Pat. No. 4,245,334 issued to Baud would be suitable for this purpose. Such a device generates an electric signal proportional to the angle of list of the device to which it is attached in both planes of interest. Other inclinometers may also be suitable for this purpose and such devices are encompassed within the spirit and scope of this invention. The inclinometer provides information to the control computer 30 in the same way as the pressure sensors, either through wireless telemetry or by hard wire connection. The electric signals produced by the inclinometer are proportional to the degree of list of the vessel and are treated accordingly by the control computer. The single pressure sensor 12 is attached to barge 10 as described above and is preferably positioned so that it is coincident with the lowest point on the barge below the surface of the water. The pressure sensor 12 is identical to those described above and provides a signal to the control computer 30, via a transmitter 14 and a receiver 16, that is proportional to its depth below the surface of the water. In this manner, the control computer 30 is again provided with continuous depth and inclination information, thus allowing for the automated loading of the vessel.

Thus, a method and apparatus for continuously determining the inclination and draft of a waterborne floating vessel to enable the automated loading of the vessel has been described. Although the present invention has been described with specific reference to a number of details of the preferred embodiment and with reference to FIGS. 1 through 8, it will be apparent to those skilled in the art that a number of modifications and various variations may be employed without departure from the scope and spirit of the present invention.

We claim:

1. An apparatus for continuously determining the inclination and draft of a waterborne floating vessel, said apparatus including:

a first pressure sensing device attached to said floating vessel at a first point below the level of the water in which said vessel is floating, said first pressure sensing device producing a first signal proportional to its depth below the surface of the water;

a second pressure sensing device attached to said floating vessel at a second point below the level of the water in which said vessel is floating, said second pressure sensing device producing a second signal proportional to its depth below the surface of the water;

a computer, said computer receiving said first signal and said second signal and computing the draft and inclination of said vessel therefrom.

2. The apparatus of claim 1 wherein said first pressure sensing device comprises a pressure transducer.

3. The apparatus of claim 1, wherein said computer further receives a signal proportional to the density of said water in which said vessel is floating.

4. The apparatus of claim 1 further including:

a transmitter, said transmitter coupled to said first pressure sensing device, said transmitter receiving said first signal as an input and producing a broadcast signal in response thereto; and a receiver, said receiver coupled to said computer and receiving said broadcast signal as an input and providing an output signal to said computer in response thereto, said output signal corresponding to said first signal.

5. The apparatus of claim 4 wherein said first pressure sensing device is coupled to a first end of a support pole, said support pole being secured to said floating vessel such that said first pressure sensing device is positioned below the surface of the water.

6. The apparatus of claim 1, further comprising:

a third pressure sensing device attached to said floating vessel at a third point below the level of the water in which said vessel is floating, said third pressure sensing device producing a third signal proportional to its depth below the surface of the water; and a fourth pressure sensing device attached to said floating vessel at a fourth point below the level of the water in which said vessel is floating, said fourth pressure sensing device producing a fourth signal proportional to its depth below the surface of the water.

7. The apparatus of claim 6 further comprising a first transmitter, said first transmitter coupled to said first pressure sensing device, said first transmitter receiving said first signal as an input and producing a first broadcast signal in response thereto;

a second transmitter, said second transmitter coupled to said second pressure sensing device, said second transmitter receiving said second signal as an input and producing a second broadcast signal in response thereto;

a third transmitter, said third transmitter coupled to said third pressure sensing device, said third transmitter receiving said third signal as an input and producing a third broadcast signal in response thereto;

a fourth transmitter, said fourth transmitter coupled to said fourth pressure sensing device, said fourth transmitter receiving said fourth signal as an input and producing a fourth broadcast signal in response thereto;

a receiver, said receiver coupled to said computer and receiving each of said first, second, third and fourth broadcast signals as inputs and providing an output signal to said computer in response thereto, said output signal corresponding to said first signal, said second signal, said third signal and said fourth signal.

8. An apparatus for automatically loading a waterborne floating vessel with flowable materials, said apparatus including:

a plurality of pressure sensors, each of which is attached to said vessel and positioned such that it is below the surface of the water in which said vessel is floating;

a computer; and a loading controller coupled to said computer, wherein each of said pressure sensors generates a depth signal, and wherein said computer receives each of said depth signals and provides control signals to said loading controller in response thereto so as to control the delivery of flowable materials into said floating vessel.

9. The apparatus of claim 8, wherein at least one of said plurality of pressure sensors comprises a pressure transducer.

10. The apparatus of claim 9, wherein said computer further receives a signal proportional to the density of said water in which said vessel is floating.

11. The apparatus of claim 8, wherein said plurality of pressure sensors is four.

12. The apparatus of claim 8, further including:

a plurality of transmitters, each of said plurality of transmitters coupled to one of said plurality of pressure sensors, each of said plurality of transmitters transmitting a corresponding depth signal produced by a corresponding pressure sensor; and a receiver, said receiver coupled to said computer, said receiver receiving each of said transmitted depth signals from each of said plurality of transmitters and providing an output signal to said computer, said output signal corresponding to said depth signals.

13. The apparatus of claim 8, further including:

a transmitter, said transmitter coupled to at least one of said plurality of pressure sensors, said transmitter transmitting a corresponding depth signal produced by said at least one pressure sensor; and a receiver, said receiver coupled to said computer, said receiver receiving said transmitted depth signal and providing an output signal to said computer, said output signal corresponding to said depth signal.

14. An apparatus for automatically loading a water borne floating vessel with flowable material, said apparatus comprising:

a pressure sensor, said pressure sensor attached to said vessel and positioned such that it is below the surface of the water in which said vessel is floating, said pressure sensor generating a depth signal;

an inclinometer, said inclinometer attached to said floating vessel such that the artificial horizon of said inclinometer corresponds to a level trim condition of said vessel with respect to the surface of the water in which it is floating, said inclinometer generating a list signal corresponding to the list of said vessel;

a computer; and a loading controller, wherein said computer receives each of said depth signal and said list signal and provides control signals to said loading controller in response to said depth and list signals as to control the delivery of flowable materials into said floating vessel such that said vessel is in a level trim condition and at a desired draft upon completion of loading.

15. A method of continuously determining the draft and inclination of a water borne floating vessel as said vessel is being loaded comprising the steps of:

attaching a plurality of pressure sensors to said floating vessel at strategic points on said vessel, each of said pressure sensors being positioned below the surface of the water in which said vessel is floating, each of said plurality of pressure sensors producing a depth signal proportional to the depth of the corresponding pressure sensor below the surface of the water;

monitoring each of said depth signals and continuously determining the corresponding draft and inclination of said vessel therefrom.

16. A method of automatically loading a water borne floating vessel with flowable material comprising the steps of:

delivering flowable material into said vessel at one location on said vessel;

sensing the draft of said vessel near the one location at which said flowable material is being delivered;

moving said vessel relative to said one location at which flowable material is being delivered in response to said sensing;

delivering said flowable material into said vessel at a second location thereon and sensing the draft of said vessel near said second location;

moving said vessel in response to said sensing near said second location and repeating the delivering, sensing and moving until the vessel is fully loaded with flowable materials;

sensing the overall draft and inclination of said vessel during all of the above procedures and controlling and terminating the delivery of flowable materials into said vessel to maintain said overall draft and inclination within predefined limits, such that when said vessel is fully loaded it is in a level trim condition and at a selected draft.

17. A method of automatically loading a water borne floating vessel with flowable material comprising the steps of:

attaching a plurality of pressure sensors to said floating vessel at strategic points on said vessel, each of said pressure sensors being positioned below the surface of the water in which said vessel is floating, each of said plurality of pressure sensors producing a depth signal proportional to the depth of the corresponding pressure sensor below the surface of the water;

monitoring each of said depth signals and continuously determining the corresponding draft and inclination of said vessel therefrom;

delivering flowable material into said vessel at one location on said vessel while monitoring each of said depth signals;

moving said vessel relative to said one location at which flowable material is being delivered in response to said depth signals;

delivering said flowable material into said vessel at a second location thereon while monitoring each of said depth signals;

moving said vessel in response to said depth signals and repeating the monitoring, delivering and moving until the vessel is fully loaded with flowable materials; and terminating the delivery of flowable materials into said vessel in response to said depth signals when a desired draft for said vessel has been reached and the inclination of said vessel is such that said vessel is in a level trim condition.

* * * * *